(12) United States Patent
Mock et al.

(10) Patent No.: US 7,826,409 B2
(45) Date of Patent: Nov. 2, 2010

(54) ROUTE IDENTIFICATION USING SHORT RANGE WIRELESS BEACONING DEVICES

(75) Inventors: Von A. Mock, Boynton Beach, FL (US); Jose E. Korneluk, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 917 days.

(21) Appl. No.: 11/616,074

(22) Filed: Dec. 26, 2006

(65) Prior Publication Data
US 2008/0153515 A1 Jun. 26, 2008

(51) Int. Cl.
*H04W 4/00* (2009.01)
(52) U.S. Cl. .............. 370/328; 370/331; 340/932.2; 340/937; 455/456.5
(58) Field of Classification Search .......... 455/456.5; 340/932.2, 995.12, 937, 426
See application file for complete search history.

(56) References Cited

U.S. PATENT DOCUMENTS

| | | | | |
|---|---|---|---|---|
| 5,910,782 | A | * | 6/1999 | Schmitt et al. ......... 340/995.12 |
| 6,081,206 | A | * | 6/2000 | Kielland ................. 340/937 |
| 6,147,624 | A | | 11/2000 | Clapper |
| 2004/0258021 | A1 | * | 12/2004 | Kashimoto et al. ......... 370/331 |
| 2005/0228583 | A1 | | 10/2005 | Capuano |

FOREIGN PATENT DOCUMENTS

| | | | | |
|---|---|---|---|---|
| JP | 02204900 | A | * | 8/1990 |
| JP | 05012599 | A | * | 1/1993 |
| JP | 05120599 | A | * | 5/1993 |
| JP | 2002111806 | A | * | 4/2002 |

OTHER PUBLICATIONS

Halfbakery.com, Car Locator Compass—Locate your car in a crowded parking lot or on-street parking, http://www.halfbakery.com/idea/Car_20Locator_20Compass, Feb. 26, 2003, 2 pgs.

* cited by examiner

*Primary Examiner*—David Q Nguyen
(74) *Attorney, Agent, or Firm*—Cuenot, Forsythe & Kim

(57) ABSTRACT

A method (400, 500) of identifying a route traveled. The method can include, while traveling away from an initial location (115), detecting a unique identifier for each of a plurality of wireless communication devices (125) along the route. The method also can include presenting an indicator (210) that indicates a relative distance from at least one of the wireless communication devices while traveling toward the initial location. Detecting the unique identifier for each of the plurality of wireless communication devices can include detecting a media access control (MAC) identifier or an Internet protocol (IP) address for at least one of the communication devices.

18 Claims, 3 Drawing Sheets

US 7,826,409 B2

ROUTE IDENTIFICATION USING SHORT RANGE WIRELESS BEACONING DEVICES

BACKGROUND OF THE INVENTION

1. Field of the Invention

The present invention relates to short range wireless communication devices.

2. Background of the Invention

People oftentimes forget where they parked their vehicles, especially when they park in large, crowded parking lots, such as those located at amusement parks, sports stadiums, airports and shopping malls. Consequently, people sometimes find themselves walking up and down rows of parked vehicles looking for their particular vehicles. When someone has a popular vehicle in a common color scheme, finding his vehicle in such circumstances can be especially difficult. Accordingly, there remains a need to help vehicle owners to find their vehicles in large parking lots.

SUMMARY OF THE INVENTION

The present invention relates to a method of identifying a route traveled. The method can include, while traveling away from an initial location, detecting a unique identifier for each of a plurality of wireless communication devices along the route. The method also can include presenting an indicator that indicates a relative distance from at least one of the wireless communication devices while traveling toward the initial location. Detecting the unique identifier for each of the plurality of wireless communication devices can include detecting a media access control (MAC) identifier or an Internet protocol (IP) address for at least one of the communication devices. Detecting the unique identifier for each of the plurality of wireless communication devices further can include detecting at least one of the unique identifiers in accordance with a short range wireless communication protocol.

At least one of the unique identifiers can be detected from a wirelessly transmitted beacon. For example, the unique identifier can be detected from a wireless communication device passed while traveling away from the initial location. In one arrangement, the unique identifier can be detected from a wireless communication device associated with a parked vehicle passed while traveling away from the initial location.

Presenting the indicator that indicates a relative distance from at least one of the wireless communication devices can include presenting a plurality of the indicators, each of the indicators associated with a respective one of the wireless communication devices. Further, each of the detected unique identifiers can be associated with a unique symbol. While traveling toward the initial location, a plurality of the unique symbols can be presented in an order that is reverse from the order in which the unique identifiers were detected. Further, presenting the indicator that indicates the relative distance can include presenting a plurality of such indicators and associating each of the presented indicators with a respective symbol. Presenting the indicator that indicates the relative distance also can include presenting the indicator in a first manner when the relative distance is decreasing, and presenting the indicator in a second manner when the relative distance is increasing.

The present invention also relates to a route identification device. The route identification device can include a receiver that, while traveling away from an initial location, detects a unique identifier for each of a plurality of wireless communication devices along the route. The route identification device also can include a user interface that, while traveling toward the initial location, presents an indicator that indicates a relative distance from at least one of the wireless communication devices. The unique identifier detected by the receiver can include a media access control (MAC) identifier or an Internet protocol (IP) address for at least one of the communication devices. The receiver can detect the unique identifier in accordance with a short range wireless communication protocol. The receiver can detect the unique identifier from a wirelessly transmitted beacon. For example, the receiver can detect the unique identifier from a wireless communication device associated with a parked vehicle passed while traveling away from the initial location.

The user interface can present a plurality of the indicators, each of the indicators associated with a respective one of the wireless communication devices. The user interface also can associate each of the detected unique identifiers with a unique symbol. While traveling toward the initial location, the user interface can present a plurality of the unique symbols in an order that is reverse from the order in which the unique identifiers were detected.

The user interface also can present a plurality of indicators that indicate relative distances from respective ones of the wireless communication devices, and associates each of the presented indicators with a respective symbol. Further, the user interface can present the indicator in a first manner when the relative distance is decreasing, and present the indicator in a second manner when the relative distance is increasing.

The present invention also can be embedded in a program storage device readable by a machine, tangibly embodying a program of instructions executable by the machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method for identifying a route traveled away from a particular location by detecting identifiers for wireless communication devices passed along the route. The same identifiers then can be detected on a return trip to guide a user back to the original location. For example, after a user has parked his vehicle and he has begun to walk through a parking lot toward a particular destination, his route identification device can detect beacons generated by other wireless communication devices passed while along the way. During a return trip back to the vehicle, the user's route identification device can detect one or more of the same beacons that are still present and, based on such beacons, present to the user one or more indicators that guide the user to his vehicle. At this point it should be noted that although the present invention can be used to guide a user through a parking lot, the present invention also can be used to guide a user through a city, a village, a residential neighborhood, an amusement park, a zoo, a shopping center, a storage warehouse or any other area through which a user may travel.

Figure 1:
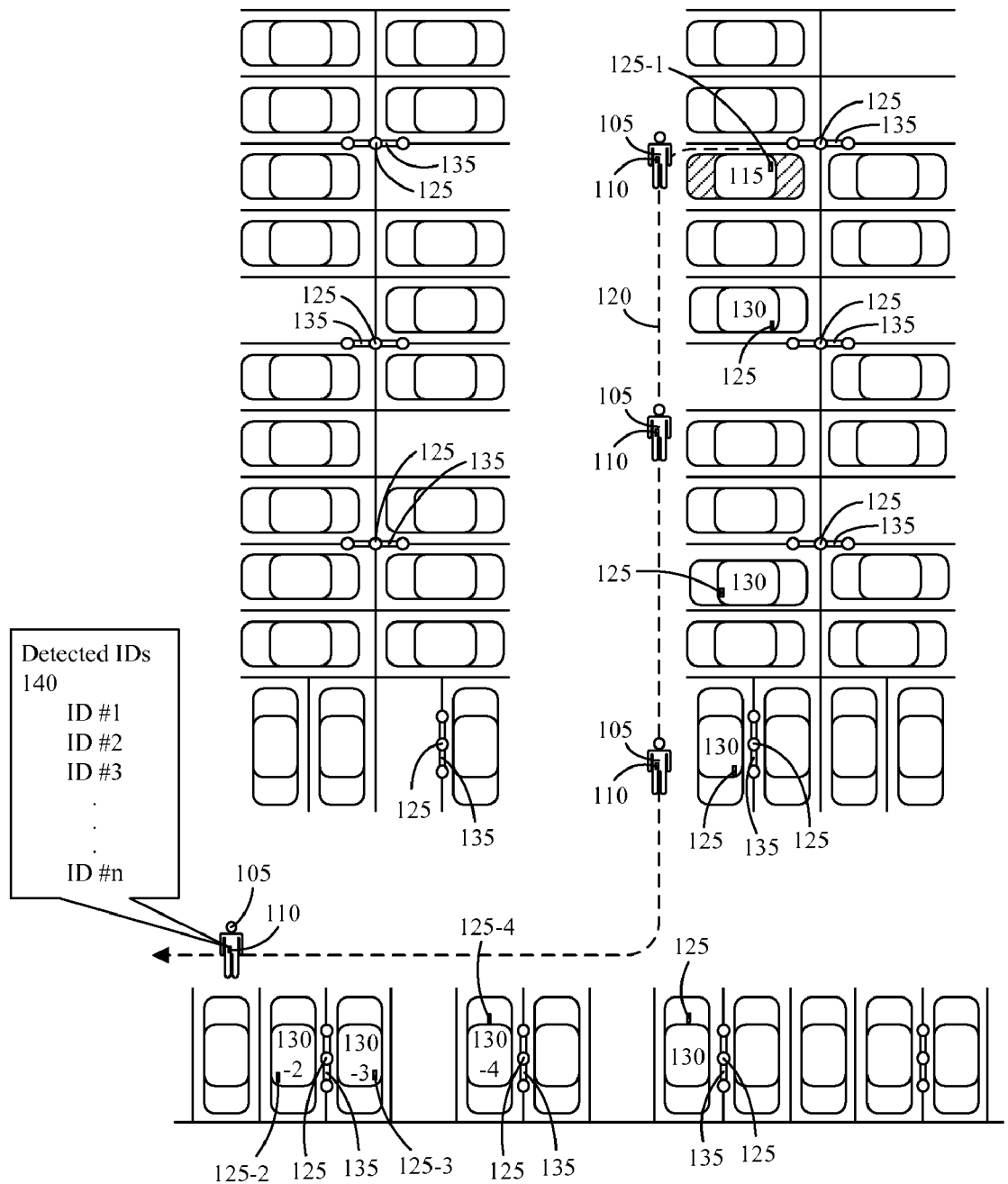
FIG. 1 depicts a top view of a parking lot that is useful for understanding the present invention.

FIG. 1 depicts a top view of a parking lot 100 that is useful for understanding the present invention. After a user 105 has parked his vehicle 115 in the parking lot 100, a route identification device 110 carried on the user's person can be activated. The route identification device 110 can be activated in response to a user input, or automatically activated upon detecting exit from the vehicle. For example, the route identification device 110 can begin tracking the route upon losing detection of a signal generated by a particular wireless communication device, for instance a wireless communication device 125-1 within the vehicle 115 or otherwise associated with the vehicle 115. Of course, if route tracking is to be implemented to track the user's route away from any other location, route identification can be automatically initiated in response to losing detection of one or more signals associated with such location.

The route identification device 110 can track the user's route 120 as he travels away from an initial location, for example the vehicle 115. To track the route 120, the route identification device 110 can detect beacons transmitted by wireless communication devices 125 that the user passes as he travels along the route 120. Such wireless communication devices 125 can be placed inside, or otherwise associated with, one or more vehicles 130 parked proximate to the route 120. The wireless communication devices 125 also can be attached to light posts 135 or other parking lot infrastructure. In one arrangement, the wireless communication devices 125 can be embedded in the floor of the parking lot 100, for instance within asphalt or concrete, or disposed within markers attached to the parking lot 100.

The wireless communication devices 125 can be any devices that transmit a short range communication signal that contains a unique identifier and that is detectable by the route identification device 110 when the route identification device 110 is proximate to such devices. For example, the wireless communication devices 125 can be mobile stations (e.g. mobile telephones, mobile radios, mobile computers, portable music/video devices, portable gaming devices, and the like), mobile station accessories (e.g. headsets, speakerphones, etc.), or RF identification modules (RFIDs).

The wireless communication devices 125 can communicate the short range communication signals in accordance with a suitable communications protocol, for instance Bluetooth, ZigBee or IEEE 802.11. Still, any other suitable communications protocol can be used and the invention is not limited in this regard. The unique identifier that is communicated by each of the wireless communication devices 125 can be a media access control (MAC) identifier, an internet protocol (IP) address, a device name, a user name, or any other identifier that can be uniquely assigned to a wireless communication device 125. It can be appreciated that the media access control (MAC) identifier as well as the internet protocol (IP) address can be obtained without having to establish a two way communication link with a wireless communication device 125, but merely by decoding information received at the route identification device 110.

The route identification device 110 can store the detected identifiers 140 in sequential order. When the user 105 attempts to travel back to his vehicle 115, symbols associated with the identifiers 140 can be presented in reverse order. In addition, for one or more of the identifiers, a proximity indicator can be presented that indicates a relative distance between the route identification device 110 and the wireless communication device 125 with which the identifier is associated. For instance, as the user 105 travels back to his vehicle 115, the beacons from the wireless communication devices 125 which are still present can again be detected by the route identification device 110. The receive signal strength of each of the beacons can be processed and to generate the proximity indicator. Further, the proximity indicator associated with a particular wireless communication device 125 can be presented in a first manner as the route identification device 110 moves closer to the wireless communication device 125, and in a second manner as the route identification device 110 moves further from the wireless communication device 125. Accordingly, the proximity indicators can guide the user back to his vehicle 115.

For example, assume the user 105 is returning back to his vehicle 115 and is attempting to follow the original route 120. As the user 105 approaches the vehicle 130-2, the beacon from the wireless communication device 125-2 can be detected by the route identification device 110 and its corresponding symbol can be presented to the user. In addition, a proximity indicator can be presented to the user 105. The proximity indicator can be an effect applied to the corresponding symbol, for instance a particular color applied to the symbol, or the proximity indicator can be a separate symbol associated with the first symbol. The shade of color can change as the user 105 gets closer to the wireless communication device 125, for instance to a darker shade. After the route identification device 110, and hence the user 105, passes the wireless communication device 125-2, the color in which the proximity indicator is presented can change to a different color. Further, as the route identification device 110 gets further from the wireless communication device 125-2, the shade of color can change, for instance to a lighter shade.

In the present example, assume that the vehicle 130-3 is no longer parked in the parking lot 100. Thus, a beacon from the wireless communication device 125-3 would not be detected, and the proximity indicator for the communication device 125-3 can be presented in a manner that indicates the signal is not detected, or the proximity indicator need not be presented. If, however, the vehicle 130-4 is still parked in the parking lot 100, the beacon from the wireless communication device 125-4 can be detected and a corresponding proximity indicator can be presented.

Further, a course indicator can be provided to indicate whether the user is on course (e.g. properly retracing his initial route) or off course. Such an indicator can indicate "on course" while the route identification device 110 detects movement towards one or more of the wireless communication devices 125 generating the previously detected positions, or indicate "off course" if the route identification device 110 detects movement away from such wireless communication devices 125 or detects movement in an incorrect direction (e.g. moving toward a wireless communication device 125 which has already been passed during the return trip).

The route identification device 110 can indicate an estimated distance from a present location to the initial location 115. For example, if a wireless communication device 125-1 associated with the user's vehicle 115 can be detected, its detected signal strength can be processed to estimate the distance. In another arrangement, the distance originally traveled away from the initial location 115 can be estimated by identifying approximate distances between sequentially detected wireless communication devices 125, and summing such distances. Further, such distances can be stored in the route identification device 110. On the return trip, the route identification device 110 can estimate the distance remaining by subtracting the distances associated with particular ones of the wireless communication devices as such devices are passed by the user 105 along the route.

In lieu of, or in addition to, presenting the proximity and course indicators on a display, such indicators can be presented in any other suitable manner. For example, the indicators can be presented as audio signals or vibration signals. The audio and/or vibration signals can be presented in a first manner while the route identification device is on course and moving toward a particular wireless communication device 125, and can be presented in a second manner while the route identification device is off course and moving away from the wireless communication devices 125.

In another arrangement, the course/proximity indicators can be presented with indicator lamps. A first indicator lamp of a particular color can be presented while the route identification device is moving toward a particular wireless communication device 125, and a second indicator lamp of another color can be presented while the route identification device is moving away from the wireless communication device 125. Alternatively, a second indicator lamp that presents a plurality of colors can be used to indicate both movement toward the wireless communication device 125 and movement away from the wireless communication device 125.

Figure 2:
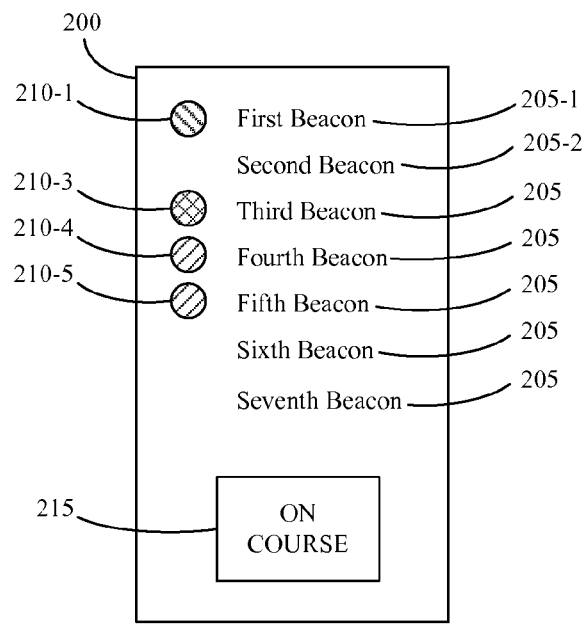
FIG. 2 depicts a screen of a user interface associated with a route identification device that is useful for understanding the present invention.

FIG. 2 depicts a screen 200 that may be presented by a user interface associated with a route identification device. The screen 200 can include a plurality of symbols 205 corresponding to the beacons detected by the route identification device while the user traveled away from the initial location. The symbols 205 can be presented as text, icons, or in any other suitable manner. In one arrangement, the symbols 205 can be presented in an order that is reverse from the order in which they were detected. For example, the first beacon symbol 205-1 can represent the last beacon detected, the second beacon symbol 205-2 can represent the second to last beacon detected, and so on. In an alternate arrangement, the symbols 205 can be presented in the order in which the beacons were detected. For instance, the first beacon symbol 205-1 can represent the first detected beacon, the second beacon symbol 205-2 can represent the second beacon, etc.

A proximity indicator 210 also can be associated with each of the beacons detected while the user is traveling back to his vehicle. For example, a proximity indicator associated with a particular beacon can be positioned proximate to the identification symbol 205-1 that is associated with the same beacon. As noted, the proximity indicators 210 can be presented in a manner that indicates whether the beacons are detected, indicates the proximity of the route identification device to the respective wireless communication devices, and indicates whether the route identification device is approaching or moving away from the respective wireless communication devices. In one arrangement, in lieu of presenting the proximity indicators as separate symbols, the proximity indicators can be provided as effects applied to the symbols 205. The effects can comprise selected colors, color shading, or any other desired effects.

Expanding on the previous example, the proximity indicator 210-1 can be presented to indicate that the route identification device has detected the same beacon that was last detected when the user was traveling away from his vehicle. If the route identification device has passed the wireless communication device generating the beacon and is moving away from it, the color and shade in which the proximity indicator 210-1 can be selected to indicate such. A second proximity indicator may be absent from the screen 200 if the second to last beacon is not detected. The third proximity indicator can be presented in a color and shade that indicates the route identification device is very close to the wireless communication device that is generating the third beacon. The fourth proximity indicator 210-4 and fifth proximity indicator 210-5 can be presented in a color that indicates the route identification device is moving toward wireless communication devices generating respective fourth and fifth beacons. At this point the wireless communication device generating the fourth beacon likely will be closer to the route identification device than the device generating the fifth beacon. Accordingly, the fourth proximity indicator 210-4 can be presented in a shade that is darker than the fifth proximity indicator 210-5.

In a further arrangement, an indicator 215 can be presented to indicate whether the user is on course (e.g. properly retracing his initial route) or off course. The indicator 215 can indicate "on course" while the route identification device detects movement towards one or more of the wireless communication devices generating the previously detected positions, or indicate "off course" if the route identification device detects movement away from such wireless communication devices or detects movement in an incorrect direction (e.g. moving toward a wireless communication device which has already been passed).

Based on the proximity indicators 210 and the on course/off course indicator 215, the user can navigate his way back to his vehicle. If he makes a wrong turn along the way, he likely will begin moving away from the detected beacons and may even lose detection of the beacons, in which case the user will be alerted that he is not taking the correct route back to his vehicle. He then can re-trace his steps until he again detects beacons that were originally detected when he was traveling away from his vehicle.

Figure 3:
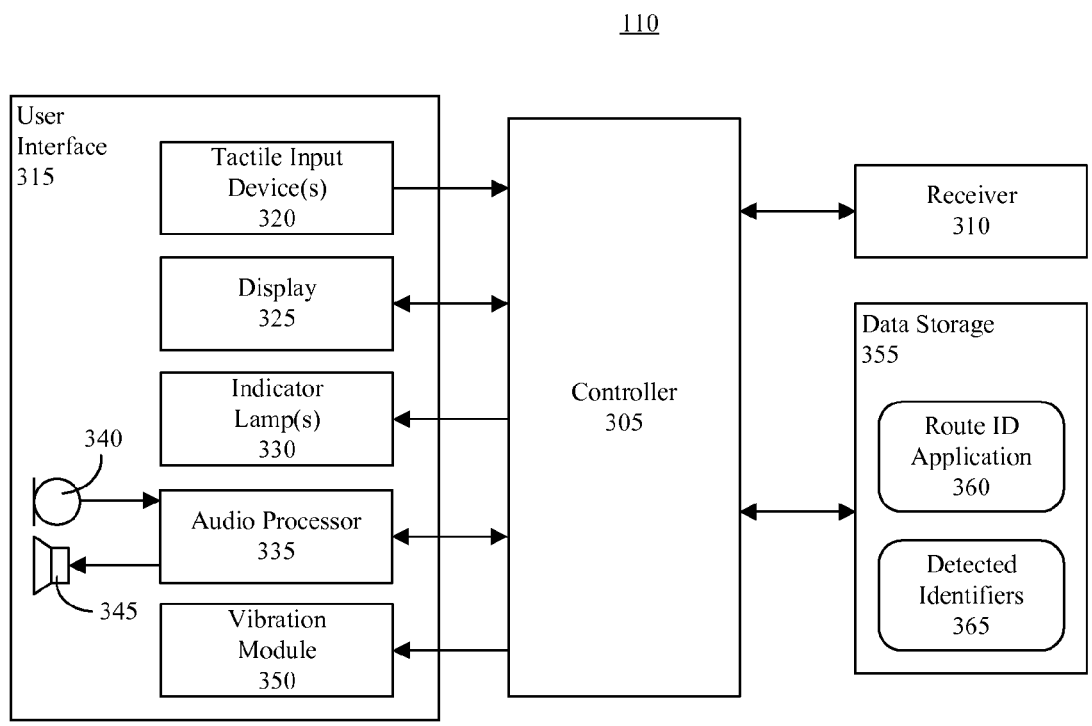
FIG. 3 depicts a block diagram of a route identification device that is useful for understanding the present invention.

FIG. 3 depicts a block diagram of an example of the route identification device 110 device that is useful for understanding the present invention. The route identification device 110 can be a device that is dedicated to performing the methods and processes described herein, or can be a device which performs other functions as well. For instance, in one arrangement, the route identification device can be a mobile station, such as a mobile telephone, a mobile radio, a mobile computer, a portable gaming device, a portable multimedia (e.g. audio and/or video) device, or any other electronic device that may be carried on one's person.

The route identification device 110 can include a controller 305. The controller 305 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The route identification device 110 also can include a receiver 310 with which the route identification device 110 uses to detect beacons transmitted by the wireless communication devices using short range communication signals. The receiver can be a component of a transceiver which also transmits signals, though this need not be the case. The receiver 310 can receive the beacons in accordance with IEEE 802 wireless communications, Bluetooth, ZigBee, direct wireless communication, or in accordance with any other suitable communications protocol.

The route identification device 110 also can include a user interface 315 comprising one or more tactile input devices 320 and a display 325. The tactile input devices 320 can comprise one or more buttons, keys, soft keys, sensors, or any other devices suitable for receiving a tactile user input. The display 325 can be a liquid crystal display (LCD), a liquid crystal on silicon (LCOS) display, a cathode ray tube (CRT), a plasma display, or any other suitable display. In one arrangement, the display 325 can comprise a touch screen that can receive tactile and/or stylus inputs and communicate such inputs to the controller 305.

One or more indicator lamps 330 also can be provided in the user interface 315 to present the indicator. In an arrangement in which a single indicator lamp 330 is provided, the color of the indicator lamp may be dynamically variable. In an arrangement in which a plurality of single color indicator lamps 330 are provided, each of the indicator lamps 330 can illuminate in a different color.

The user interface 315 further can include an audio processor 335 connected to an input audio transducer 340 (e.g. microphone) and an output audio transducer 345 (e.g. loudspeaker). The audio processor 335 can be integrated with the controller 305 or provided as a separate component that is communicatively linked to the controller 305. The audio processor 335 can comprise a CPU, a DSP, an ASIC, a PLD, a plurality of discrete components that cooperate to process audio data, and/or any other suitable audio processing device.

The audio processor 335 can receive input audio signals from the input audio transducer 340 and communicate such signals to the controller 305. For example, the input audio transducer 340 can detect spoken utterances from the user and communicate such utterances to the audio processor 335 as audio signals. The audio processor 335 can process such signals, for instance by performing analog to digital conversion, and communicate the signals to the controller 305. In one arrangement, speech recognition can be applied by the audio processor 335 and/or the controller 305. The audio processor 335 also can receive output audio signals from the controller 305 and communicate such signals to the output audio transducer 345. In an arrangement in which the indicators presented to the user are audibly presented, the audio processor 335 can communicate the indicators to the output audio transducer 345 at the behest of the controller 305.

A vibration module 350 also can be provided with the user interface 315. In an arrangement in which the indicators are presented as vibration signals, the vibration module 350 can receive indicator signals from the controller 305. As noted, a variety of vibration patterns can be provided to represent proximity of the route identification device 110 to one or more wireless communication devices, whether the user is proceeding toward or away from the wireless communication devices, whether the user is on course or off course, etc.

The route identification device 110 further can include data storage 355. The data storage 355 can include one or more storage devices, each of which can include, but is not limited to, a magnetic storage medium, an electronic storage medium, an optical storage medium, a magneto-optical storage medium, and/or any other storage medium suitable for storing digital information. In one arrangement, the data storage 355 can be integrated into the controller 305, though this need not be the case.

A route identification application 360 can be contained on the data storage 355. The controller 305 can execute the route identification application 360 to implement the processes and methods described herein. For example, at runtime, in response to a user input or detecting the user has left an initial location, the route identification application 360 can begin detecting the identifiers contained in beacons transmitted by wireless communication devices, and store such identifiers in a data file 365 (or data table). On a return trip, the route identification application 360 can detect the beacons and compare the identifiers contained therein with the detected identifiers stored in the data file 365. The route identification application 360 also can estimate relative distances between the route identification device 110 and wireless communication devices, and generate the indicators to be presented to the user via the user interface 315.

Figure 4:
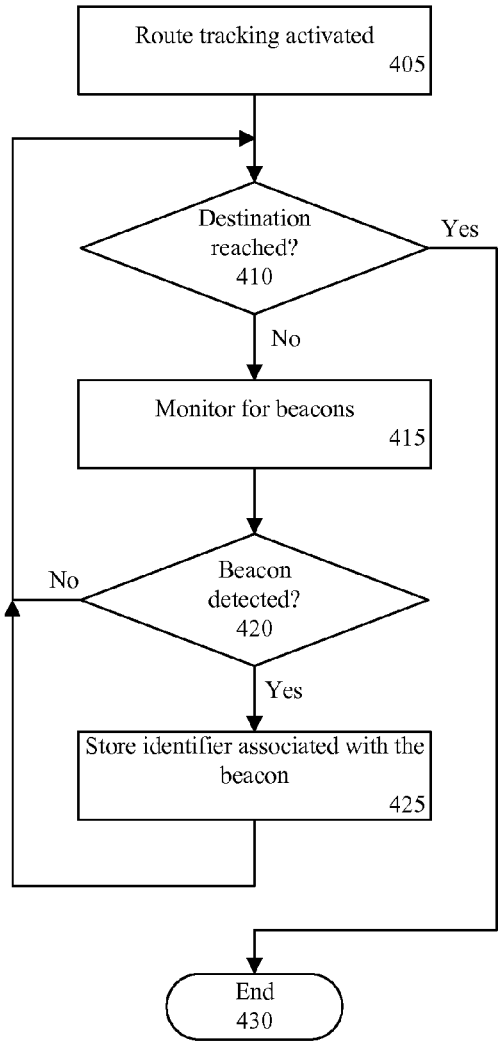
FIG. 4 is a flowchart that is useful for understanding the present invention.

FIG. 4 is a flowchart presenting a method 400 for tracking a route traveled by a user, which is useful for understanding the present invention. Beginning at step 405, route tracking can be activated. As noted, the route tracking can be activated in response to a user input in the route identification device. Such an input can be a tactile input, a spoken utterance, or any other suitable user input. Route tracking also can be initiated automatically, for instance in response to losing detection of a particular signal. Such a signal can be a signal generated by a device associated with a vehicle, a home, a building, or any other place.

Referring to decision box 410, until a destination is reached, the process can continue to step 415 and the route identification device can monitor for beacons. The destination being reached can be indicated to the route identification device in any suitable manner, for instance by a user input or the route identification device not detecting any beacons. Once the destination is reached, the tracking process can end at step 430.

Referring to decision box 420, if a beacon is detected, at step 425 an identifier associated with the beacon can be stored. Optionally, an estimated distance between a communication device generating the most recently detected beacon and a communication device generating a previously detected beacon can be estimated. The process then can return to decision box 410 and continue until the destination is reached. The destination can be a particular place, or a point along the route at which beacons are no longer being detected. For instance, if the route is through a parking lot and no beacons are detected beyond an end of the parking lot, that end of the parking lot can be considered the destination.

Figure 5:
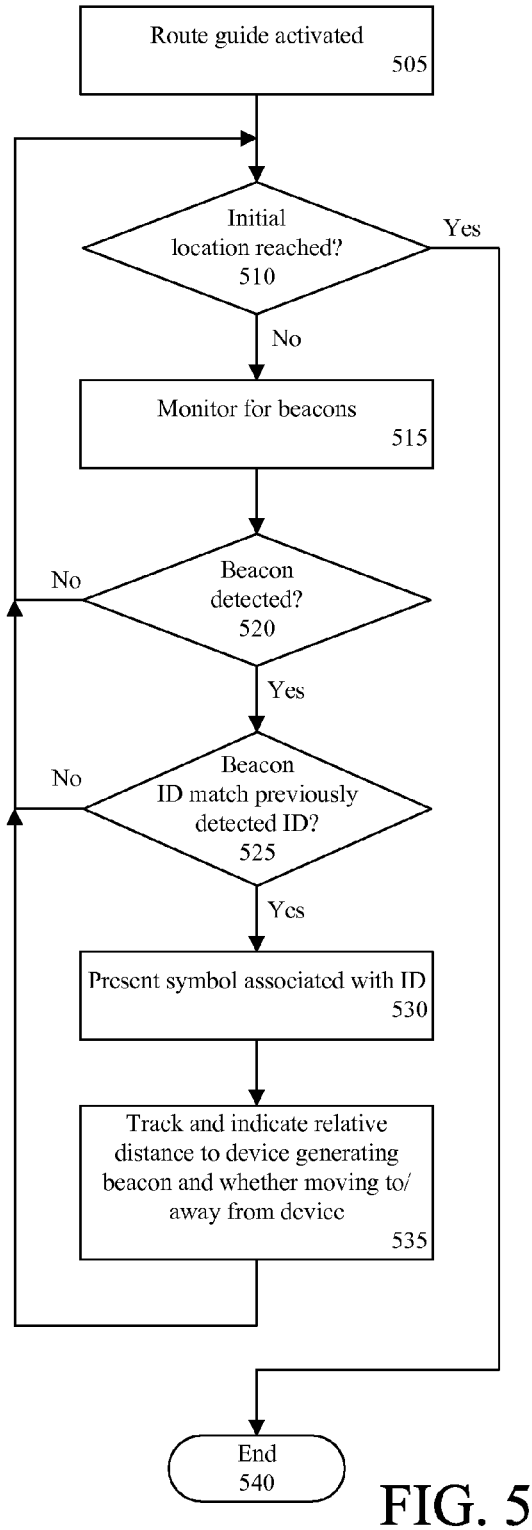
FIG. 5 is another flowchart that is useful for understanding the present invention.

FIG. 5 is another flowchart presenting a method 500 for guiding a user along a previously tracked route, which is useful for understanding the present invention. At step 505, a route guide can be activated on the route identification device. The route guide can be activated in response to a user input, or automatically. For example, the route guide can be automatically activated in response to detecting one or more of the beacons previously detected while the route was being tracked.

Referring to decision box 510, until the initial location is reached, the process can continue to step 515 and the route identification device can monitor for beacons. The initial location being reached can be indicated to the route identification device in any suitable manner, for instance by a user input or the route identification device detecting a particular beacon, for instance a beacon associated with the user's vehicle, home, or other location from where the route started. Once the initial location is reached, the guiding process can end at step 540.

Referring to decision box 520, if a beacon is detected, the process can proceed to decision box 525 and the identifier associated with the beacon can be compared to previously detected identifiers to determine whether the identifier matches any of the previously detected identifiers. If a match is found, the process can continue to step 530 and a symbol associated with the matched identifier can be presented via the user interface of the route identification device. As noted, the symbol can be presented visually, as an audio signal or as a vibration signal.

At step 535, the relative distance between the route identification device and the wireless communication device generating the beacon can be tracked. The relative distance can be determined, for instance, by the relative signal strength of the received beacon. Whether the route identification device is moving toward or away from the wireless communication device also can be indicated to the user. For example, if the signal strength of the beacon is increasing with respect to time, an indicator can be presented indicting that the route identification device is moving toward the wireless communication device. Similarly, if the signal strength of the beacon is decreasing with respect to time, an indicator can be presented indicting that the route identification device is moving away from the wireless communication device. The process then can return to decision box 510 and continue until the initial location is reached.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method of identifying a route traveled, comprising:
   while traveling away from an initial location, via a processor, detecting a unique identifier for each of a plurality of wireless communication devices along the route, wherein detecting the unique identifier for each of the plurality of wireless communication devices comprises detecting at least one of the unique identifiers from a wireless communication device within a parked vehicle passed while traveling away from the initial location; and
   while traveling toward the initial location, via the processor, presenting an indicator that indicates a relative distance from at least one of the wireless communication devices.

2. The method of claim 1, wherein detecting the unique identifier for each of the plurality of wireless communication devices comprises detecting a media access control (MAC) identifier for at least one of the communication devices.

3. The method of claim 1, wherein detecting the unique identifier for each of the plurality of wireless communication devices comprises detecting an Internet protocol (IP) address for at least one of the communication devices.

4. The method of claim 1, wherein detecting the unique identifier for each of the plurality of wireless communication devices comprises detecting at least one of the unique identifiers in accordance with a short range wireless communication protocol.

5. The method of claim 1, wherein detecting the unique identifier for each of the plurality of wireless communication devices comprises detecting at least one of the unique identifiers from a wirelessly transmitted beacon.

6. The method of claim 1, wherein detecting the unique identifier for each of the plurality of wireless communication devices comprises detecting at least one of the unique identifiers from a wireless communication device passed while traveling away from the initial location.

7. The method of claim 1, wherein presenting the indicator that indicates a relative distance from at least one of the wireless communication devices comprises presenting a plurality of the indicators, each of the indicators associated with a respective one of the wireless communication devices.

8. The method of claim 1, wherein presenting the indicator that indicates the relative distance comprises:
   presenting the indicator in a first manner when the relative distance is decreasing; and
   presenting the indicator in a second manner when the relative distance is increasing.

9. A method of identifying a route traveled, comprising:
   while traveling away from an initial location, via a processor, detecting a unique identifier for each of a plurality of wireless communication devices along the route; and
   while traveling toward the initial location, via the processor, presenting an indicator that indicates a relative distance from at least one of the wireless communication devices;

via the processor, associating each of the detected unique identifiers with a unique symbol; and while traveling toward the initial location, via the processor, presenting a plurality of the unique symbols in an order that is reverse from the order in which the unique identifiers were detected;

wherein presenting the indicator that indicates the relative distance comprises presenting a plurality of such indicators and associating each of the presented indicators with a respective symbol.

10. A route identification device, comprising:

a receiver that, while traveling away from an initial location, detects a unique identifier for each of a plurality of wireless communication devices along the route, wherein the receiver detects the unique identifier from a wireless communication device within a parked vehicle passed while traveling away from the initial location; and a user interface that, while traveling toward the initial location, presents an indicator that indicates a relative distance from at least one of the wireless communication devices.

11. The route identification device of claim 10, wherein the unique identifier detected by the receiver comprises a media access control (MAC) identifier for at least one of the communication devices.

12. The route identification device of claim 10, wherein the unique identifier detected by the receiver comprises an Internet protocol (IP) address for at least one of the communication devices.

13. The route identification device of claim 10, wherein the receiver detects the unique identifier in accordance with a short range wireless communication protocol.

14. The route identification device of claim 10, wherein the receiver detects the unique identifier from a wirelessly transmitted beacon.

15. The route identification device of claim 10, wherein the user interface presents a plurality of the indicators, each of the indicators associated with a respective one of the wireless communication devices.

16. The route identification device of claim 10, wherein the user interface presents the indicator in a first manner when the relative distance is decreasing, and presents the indicator in a second manner when the relative distance is increasing.

17. A route identification device, comprising:

a receiver that, while traveling away from an initial location, detects a unique identifier for each of a plurality of wireless communication devices along the route; and a user interface that, while traveling toward the initial location, presents an indicator that indicates a relative distance from at least one of the wireless communication devices;

wherein:

the user interface associates each of the detected unique identifiers with a unique symbol;

while traveling toward the initial location, the user interface presents a plurality of the unique symbols in an order that is reverse from the order in which the unique identifiers were detected; and the user interface presents a plurality of indicators that indicate relative distances from respective ones of the wireless communication devices, and associates each of the presented indicators with a respective symbol.

18. A program storage device readable by a machine, tangibly embodying a program of instructions executable by the machine to perform method steps for identifying a route traveled, said method steps comprising:

while traveling away from an initial location, detecting a unique identifier for each of a plurality of wireless communication devices along the route, wherein detecting the unique identifier for each of the plurality of wireless communication devices comprises detecting at least one of the unique identifiers from a wireless communication device within a parked vehicle passed while traveling away from the initial location; and while traveling toward the initial location, presenting an indicator that indicates a relative distance from at least one of the wireless communication devices.

* * * * *